United States Patent [19]
Rumbaugh

[11] 3,921,617
[45] Nov. 25, 1975

[54] KITCHEN APPLIANCE FOR COOKING FOOD

[76] Inventor: Hugh M. Rumbaugh, 1370 Revere Road, Akron, Ohio 44313

[22] Filed: June 8, 1973

[21] Appl. No.: 368,679

Related U.S. Application Data

[63] Continuation of Ser. No. 175,363, Aug. 26, 1971, abandoned, which is a continuation of Ser. No. 784,958, Dec. 18, 1968, abandoned.

[52] U.S. Cl. ........................... 126/21 R; 126/273 R
[51] Int. Cl. ............................................. F24c 15/32
[58] Field of Search ............ 126/21 R, 21 A, 273 R, 126/273 A, 19

[56] References Cited
UNITED STATES PATENTS

| | | | |
|---|---|---|---|
| 3,150,655 | 9/1964 | Saponara | 126/21 R |
| 3,613,656 | 10/1971 | Henderson | 126/21 R |
| 3,633,561 | 1/1972 | Barnett et al. | 126/21 R |

*Primary Examiner*—Edward G. Favors

[57] ABSTRACT

A kitchen appliance having means and methods of providing a self regulating balanced oven atmosphere flow of heated air, for cooking food, by employing the energy generated by the combustion of a gas burner that supplies heat to the interior of an oven cavity, and to an exterior oven air passageway having venturi means adapted to the exterior passageway.

The venturi means is utilized to improve and increase the prior passageway flow of heated air, so as to exceed the flow speed of the prior flow, as a higher velocity flow of heated air, which is then directed to flow over one side to the opposite side, and to cover the entire exterior gap opening area of a provided vent gap opening communicating from the interior of the cooking cavity, so that the improved higher velocity flow of heated air while thusly flowing over the oven vent gap opening, maintains a dominating vacuum over the entire opening area of the oven vent gap opening, while vacuuming all heated air within the oven vent gap opening, through the vent gap opening to the exterior side of the vent gap opening, while cooking a food mass within the oven cavity.

4 Claims, 1 Drawing Figure

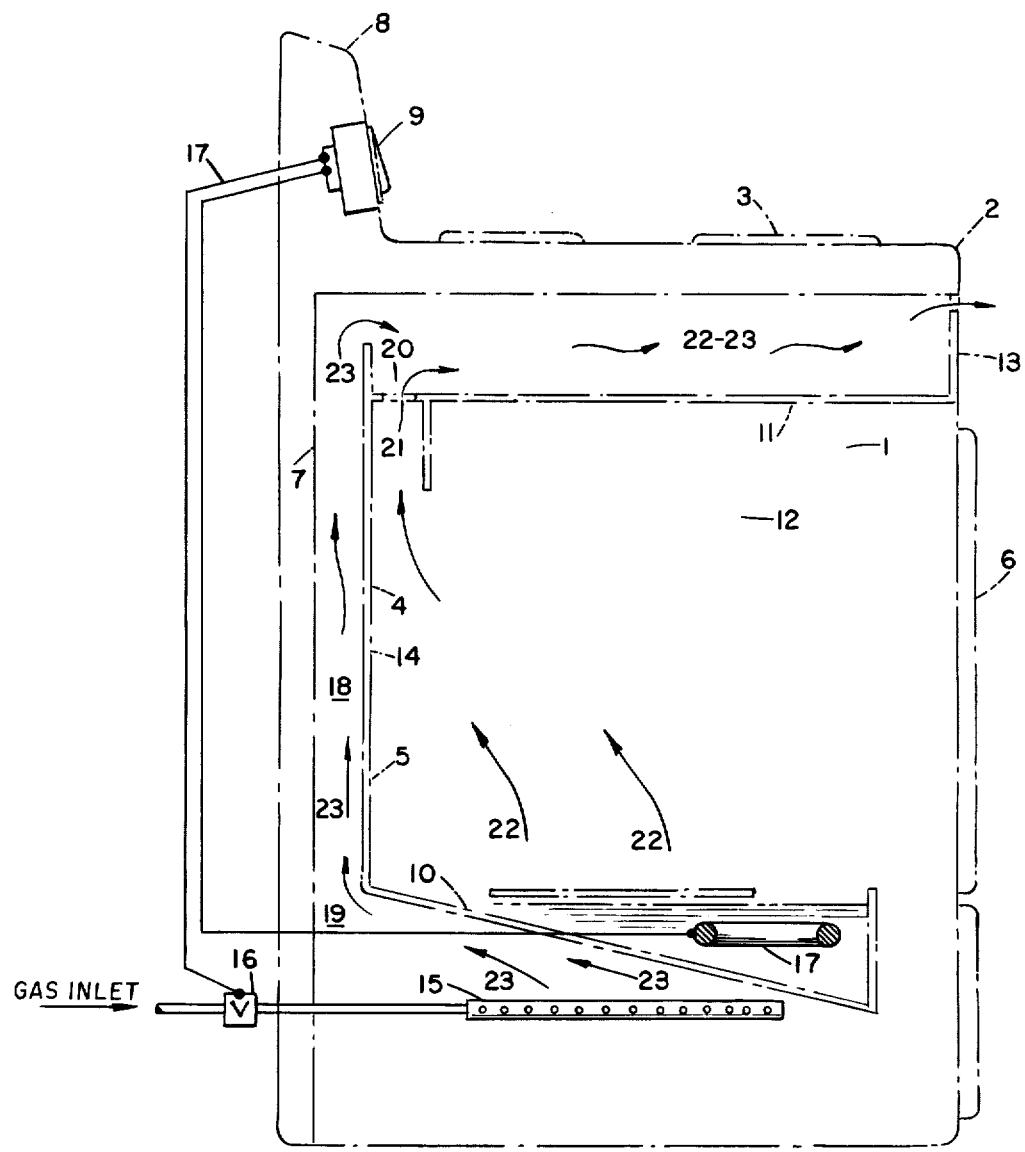

KITCHEN APPLIANCE FOR COOKING FOOD

This is a continuation of application Ser. No. 175,363 filed Aug. 26, 1971, now abandoned, which is a continuation of Ser. No. 784,958 filed Dec. 18, 1968, now abandoned.

The present invention relates to a kitchen appliance for cooking food, etc, and, particularly to an oven having gas fuel burners in combination with dual use oven exhaust vent means to utilize the waste fuel gases of the product of combustion of the gas burner means which supplies the power required to induce forced air movement to flow in an air passageway means to a region, wherein said air causes means and air to draw other air through a dual exhaust vent means communicating from the oven's atmosphere to cause controlled responsive cooking atmosphere in a cooking oven. Said conditions improves cooking results, by eliminating smoke, odor, moisture and excessive heat out of an oven's atmosphere.

The invention disclosed herein overcomes major difficulties experienced with ovens employing the closed principle of heating an oven wherein heat is transferred through the oven's liner material to the interior of the oven to contact and cook food products therein. Said type ovens have atmosphere in the heated oven that is virtually starved of air movement within the oven, which conditions causes unsatisfactory cooking results. To alleviate this condition costly, troublesome, motor powered air impeller, means have been employed in such ovens to supply the force to circulate air in such ovens. Such circulating means in an oven are self limiting because of cost, space consuming requirements to install said means, operating part failure due to heat creepage distortion, also because air propelled by an impeller is hard to control.

I have invented means and methods in simplified form which utilizes fewer parts in an appliance that achieves a balanced efficient air movement controlled means at a reduced cost and produces superior, faster controlled cooking results. Success has been gained by utilizing the energy generated by the oven burner gas heating means to induce controlled force air movement whereby the gas burner's heated air is channelled and directed over food products to cook said food and remove smoke, odor, moisture, and excessive heat out of said oven. In addition, the said means establishes a controlled directional flow of all heated air flowing in the cooking oven to follow a path towards the back of said oven whereby only cool air can enter from the exterior of said oven through small leaks caused by distortion of parts out of line, which condition allows the cool air to reduce distortion due to heat, thereby preventing deterioration of the oven cavity's components.

To achieve these results the products of combustion of the gas burner are divided and directed into two aeolotropic streams of air, then are channelled into separate air passageway means to effect a balanced system of performing a cooking operation and eliminating cooking residue smoke, odor, moisture and excessive heat from an oven. One stream of air by conduction is passed through the oven's bottom and liner into the oven's interior, then said air stream is channelled and drawn by suction means over food to cook food then collect smoke, odor, and moisture emanating from the food products, then said stream of air is drawn to the upper area of the oven's interior to a dual air vent exhaust means from the oven communicating from the oven's interior into a region established to effect suction for drawing the stream of air and residue cooking gases through said dual exhaust vent by lifting pulling means created by the other more forceful fast moving stream of air. The other stream of air is first caused to pass over the underside of a formed bottom from the gas burner to an air passageway inlet located at the opening of the uprising passageway in the rear exterior area bottom of the oven's uprising passageway wherein the heated air stream is directed to rise upwards in the passageway while at the same time a suction effect is created to draw cool air from a lower level mixing with said stream of air then said air, stream is channelled through said uprising passageway to an established region of the oven's dual exhaust vent means which communicates into said established suction region.

The said directed uprising faster moving more forceful stream of air jets itself over the said dual oven's exhaust vent thereby creating a lower pressure region across said vent that causes the air in the oven to be drawn through the dual vent from said oven into the faster moving air stream mixing into said stream while said combined gases are exhausted to a desired area.

The heating system is regulated by means controlling the volume of gas supplied to the burner means.

The regulating system assures a balanced heat condition for cooking in the oven at all times which assures even moist cooking results and also accurate regulation of cooking temperatures as low as 130° F. and as high as desired for oven cooking and residue food gases elimination, including temperature limiting means to hold food in a cooked condition at laterserving.

By regulating the gas volume supplied to the gas burner means there is an equal regulating in the air volume in the direction and venting means which causes faster recovery and shorter and less periods of heat recovery of oven cycles.

The regulating of the gas supplied to the burner means also assures a balanced removal of smoke, odor, and moisture from the cooking oven.

As the gas supply means is regulated, there is an equal response of more or less removal from the oven of cooking residue gases.

The primary object of this invention is to provide means which utilizes gas burner combustion means to supply heat by conduction through an oven liner into the interior of the oven cavity, for establishing a controlled temperature and air flow pattern in an oven atmosphere of the cooking cavity, and to further employ the power generated by the product of combustion of the gas burner means, to draw and conduct heat in the oven in a desired direction of a moving stream of air over a thermostat control means and food products, to cook said food at a desired temperature, also draw through an exhaust vent the residue heat, smoke, odor, and moisture resulting from the cooking operation out of the oven cavity while mixing the directed streams together while the combined streams are exhausted to a desired area.

Another object is to provide means in a gas heated oven which utilizes two or more aeolotropic air streams of the product of combustion of an oven's gas burner heating means, to produce the capability to maintain in a cooking cavity, a desired cooking temperature and atmosphere caused by the action of the two aeolotropic air streams capabilities to respond equally to any change of force of said air streams caused by regulating the product of combustion given off from the gas burner means.

A further object is to provide means of dividing, directing, and rejoining the products of combustion of the gas burner means of a cooking oven into two separate aeolotropic air streams of flue gases, and also to provide venturi means that causes the stronger stream to have the capability to draw the weaker less resistant air into its air stream through a vent opening communicating from an oven's cooking cavity mixing the two streams together while exhausting and forcing the combined stream to a desired area.

A further object is to employ two aeolotropic air streams in a cooking appliance. One stream being drawn through a cooking cavity through a dual purpose oven exhaust vent communicating from the interior of a cooking oven, by directing the other stream above said dual oven exhaust vent, to draw said stream through the said dual vent, said dual vent functions to equalize the interior pressure with the exterior atmosphere pressure when the two aeolotropic streams are not being produced.

A further object is to provide means of an inclined oven bottom above a gas burner means of an oven upon which the heated gases of the product of combustion of the gas burner impinge and are then formed into two aeolotropic air streams, then one stream of air by conduction is passed through said bottom into the interior of a cooking oven, then the other air stream of air is directed by said formed inclined bottom to a passageway leading to an area wherein said stream of air is caused to draw the other stream into said stream rejoining said streams while exhausting the combined stream to a desired exhaust area.

Another object is to provide a cooking oven which utilizes the power generated by gas burner means to provide suction means to draw air upstream and then force air downstream in a gas heated cooking oven kitchen appliance in which methods of cooking food can be carried out wherein food is placed in a cooking oven atmosphere that allows food to be cooked in a stream of air that is drawn over the food and said air stream removes residue cooking gases such as smoke, odor, and moisture away from the food and prevents said removed cooking residue gases from surrounding said food while said food continues to cook.

My invention will be better understood from the following description taken in conjunction with the drawing.

FIG. 1 shows a left side elevational view of a gas oven embodying the present invention.

There is a gas oven 1 comprising a horizontal cook for supporting a plurality of surfaces burners 3.

Located beneath the cook top is an oven cavity 4 formed by an inner oven liner 5 and a front opening door 6 supported by an outer oven housing 7 which also supports the cook top 2.

There is a back splash 8 located along the back rear of the cook top 2, and it includes a control panel 9.

The oven is of box-like construction and has an inclined bottom 10, top wall 11, opposite side walls 12 and 13, and back wall 14 as shown in FIG. 1.

The front of the oven cavity 4 is open and it is arranged to be closed by the oven door 6 that is hinged along its bottom edge by hinge means not shown which is conventional in the art. The oven is fabricated of sheet metal construction and is insulated, the door supports a door gasket seal and a handle. Shelf means in the cooking cavity is also provided which are all conventional in this art and are not shown.

Below the inclined oven bottom there is a gas burner 15 and a gas supply valve 16 and also within the oven cavity a thermostat control means 17.

The gas burner 15 would be provided with an automatic pilot or ignition means and a safety detection means not shown which is also conventional to this art for regulating the gas supply to the gas burner.

In between back wall 14 and outer oven support housing 7 is a vertical air passageway 18 leading from the top of the inclined bottom 10 is a formed air inlet area 19 communicating to an uprising passageway having venturi means and directing means adapted at the the top of said passageway which direct jet stream 23 above the mixing and suction area 20 which causes air to be drawn through the dual purpose oven cavity exhaust vent and pressure equalizer opening 21 wherein said region area 20 the air streams 22 and 23 rejoin and are mixed and then are exhausted across the top of the oven's exterior.

It has been discovered that in operating an externally heated oven of the type disclosed there are many important advantageous of having means that is responsive interrelatively to simultaneously regulate a balanced effect upon the other operating means.

Cooking operations are carried out by first placing food products on a shelf in the oven cavity 4, then closing the oven door 6, and lighting the gas burner means 15.

The product of combustion impinges on the inclined bottom 10, heat from the product of combustion passes through the inclined bottom 10 into the interior of the oven cavity 4 forming heated oven cavity air stream 22. As the burner gas flame plays upon the inclined bottom, the flame and flue gases are caused to flow up the inclined bottom to transfer heat to all parts of the oven bottom evenly.

At the same time as the heat passes through the oven bottom, the balance of the flue gases of the product of gas combustion are directed over the underside of the inclined bottom 10 to air inlet 19 at the opening of the vertical air passageway 18. Then said air stream enters passageway 19 carrying mixed in it cool air drawn from an adjacent lower level of air inlet 18, then air stream 23 is directed into venturi means and thence into air suction region 20 and is then jetted at its higher velocity across the dual oven cavity exhaust vent opening 21 wherein said region 20, a low pressure area is created to draw the slower moving air stream 22 in the oven cavity 4 over the food product in said cavity to cook said food while at the same time mixing into air stream 22, smoke, odor and moisture emanating from the food products being cooked, then air stream 22 is drawn to dual vent exhaust 21, the air being drawn through the said vent 21 into the vacuum suction region 20, then stream 22 rejoins and mixes into air stream 23 while exhausting the combined streams to the exterior of the cooking means.

Also it has been discovered that because of the sealed oven principle and venting system there is a simultaneous self regulating response to an equalization of air movement in the cooking oven and the air movement in the air passageway including the thermostat control means which operates to cause an even maintence of a desired oven cooking temperature, the balanced heat design assures even baking, better results and accurate control of temperature as low as 130° F.

The thermostat control means 17 operates to cause an even desired oven cooking temperature.

The balanced controlled velocity of the oven's air stream 22 in the oven cavity 4 causes an even distribution of heat movement in the oven cavity 4, also hot spots are prevented from developing in the oven cavity or other oven components.

The balanced controlled air movement prevents excessive removal of moisture from food being cooked which reduces food shrinkage and assures the retention of tasty juices.

The removal of smoke and odor away from food being cooked assures a good flavor of the food being cooked.

There is no interchange of food odor between food products.

The removal of moisture away from food being cooked prevents steaming of outer food surfaces, which steaming condition would soften food surfaces and allow juices to escape from the food.

The combination of the gas control means and venting system causes the thermostat to respond in a narrow differential pattern not heretofore possible in prior ovens using the closed oven principle.

The gas burner supplies a fast recovery of heat loss and maintains a constant even desired cooking temperature in the oven cavity.

This condition maintains a consistant cooking temperature to food products being cooked and reduces cooking time and temperature requirements below prior art gas oven cooking ovens using the closed oven principle.

The new and novel cooking means assures superior cooking results oven prior art cooking ovens.

One vivid illustration: Average potato cooking instructions in prior cooking books require for baking an average size potato as follows:

Bake at 375° F. 1 hour; at 350° F. 1½ hour.

In this new oven disclosed herein an average size potato bakes perfectly at 325° F. in ¾ of an hour.

This illustrates the improved reduced cooking time required in this new oven.

Also the balanced heat design assures accurate control of oven temperatures as low as 130° F. which allows a selection of desired cooked food holding temperatures in the oven between 130° F. and 200° F.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. In a kitchen appliance for cooking food the combination comprising a box like frame having walls, an oven liner defining a cooking cavity having a vent gap opening communicating from the interior of said cooking cavity, means of a passageway for heated air between a wall of said liner and a wall of said frame, means of a gas burner having a gas valve for connection to a source of gas, said gas burner being adapted to supply a first aeolotropic stream of heat to flow in said cooking cavity, means to supply a second aeolotropic stream of heated air from said gas burner to flow within said passageway, the improvement comprising:

venturi means adapted to said passageway arranged to direct said flow of heated air flowing within said passageway to flow from said passageway into said venturi means, so that venturi means increases the speed of flow of the said second aeolotropic stream of flow to exceed its prior flow of speed within said passageway before it entered said venturi means, said increased flow then exits from said venturi means as a jet increased speed of flow of said prior second aeolotropic stream of heated air flow supplied by said gas burner, means to direct heated air from said venturi means exiting as said increased jet flow of heated air to flow over from one side to the opposite side, and to cover the entire exterior opening area of said vent gap opening communicating from the interior of said cooking cavity, so that the said second aeolotropic jet flow of heated air while flowing over, from one side to the opposite side and covering the entire said exterior opening area of said vent gap opening, maintains a jet vacuum over and covering the entire exterior opening area of said vent gap opening, so that said maintained jet vacuum dominates and controls all movement of heat of said first aeolotropic stream of heat within said vent gap opening, and vacuums all of said first aeolotropic stream of heat within said vent gap opening communicating from the interior of said cooking cavity through said vent gap opening to the exterior of said vent gap opening.

2. The method of cooking food in a kitchen appliance combination comprising a box like frame having walls, an oven liner defining a cooking cavity having a vent gap opening communicating from the interior of said cooking cavity, means of a passageway for heated air between a wall of said liner and a wall of said frame, means of a gas burner having a gas valve for connection to a source of gas, said gas burner being adapted to supply a first aeolotropic stream of heat to flow in said cooking cavity, means to supply a second aeolotropic stream of heated air from said burner to flow within said passageway, also said kitchen appliance having an improvement comprising:

venturi means adapted to said passageway arranged to direct said flow of heated air flowing within said passageway to flow from said passageway into said venturi means so that said venturi means increases the speed of flow of the said second aeolotropic stream of flow to exceed its prior flow of speed within said passageway before it entered said venturi means, said increased flow then exits from said venturi means as a jet increased speed of flow of said prior second aeolotropic stream of heated air flow supplied by said gas burner, means to direct heated air from said venturi means, exiting as said increased jet flow of heated air to flow over from one side to the opposite side, and to cover the entire exterior opening area of said vent gap opening communicating from the interior of said cooking cavity, so that the said second aeolotropic jet flow of heated air while flowing over, from one side to the opposite side and covering the entire said exterior opening area of said vent gap opening, maintains a jet vacuum over, and covering the entire exterior opening area of said vent gap opening, so that said maintained jet vacuum dominates and controls all movement of heat of said first aeolotropic stream of heat within said vent gap opening, and vacuums all of said first aeolotropic stream of heat within said vent gap opening communicating from the interior of said cooking cavity through said vent gap opening to the exterior of said vent gap opening, the method comprising:

locating a food mass within said cooking cavity, activating said gas burner to supply a first stream of aeolotropic heat to the interior of said cooking cavity to cook said food mass, said gas burner also supplys a second aeolotropic stream of heated air to flow within said passageway and thence to flow into said venturi means, said venturi means increases the speed of flow of said second aeolotropic stream of heated air while flowing through said venturi means to an exit from said venturi means, supplying said heated air of the increased second aeolotropic stream of heated air exiting from said venturi means as a flow of heated air crossing one side of said vent gap opening communicating from the interior of said oven cavity and thence crossing the entire vent gap opening of said vent gap opening and thence to the opposite side and away from said vent gap opening, in order to supply a strong vacuum across said oven vent gap opening, maintaining said strong vacuum across said oven cavity vent gap opening in order to vacuum heat of said first aeolotropic stream of heat communicating through said vent gap opening into said strong vacuum of said second aeolotropic stream of heated air across said vent gap opening while cooking said food mass.

3. In a kitchen appliance for cooking food the combination comprising a box like frame having walls, an oven liner defining a cooking cavity having a vent gap opening communicating from the interior of said cooking cavity, means of a passageway for heated air between a wall of said liner and a wall of said frame, means of a gas burner having a gas valve for connection to a source of gas, means to supply heat from the products of combustion of said gas burner to the interior of said cooking cavity, means to supply a stream of heated air from the products of combustion of said gas burner to flow into said passageway, the improvement comprising:

venturi means adapted to said passageway arranged to direct said flow of heated air flowing within said passageway to flow from said passageway into said venturi means, so that said venturi means increases the velocity of flow of said passageway stream of heated air to exceed its prior velocity flow while flowing within said passageway, said increased velocity of flow of said stream of heated air exits from said venturi means as a higher velocity, stronger, more forceful jet stream of heated air, and also heated air of said higher velocity stream is directed by means provided, to flow across one side of said vent gap opening, and thence flows across the open entire area of the exterior of said vent gap opening and thence flows to the opposite side of said vent gap opening and thence away from said vent gap opening communicating from the interior of said cooking cavity, whereby said higher velocity stream of heated air flows or covers across the entire exterior open area of said vent gap opening communicating from the interior of said cooking cavity, so that the said flow of heated air while thusly flowing entirely across the open area of said vent gap opening maintains a strong vacuum across the entire exterior open area of said vent gap opening, so that said vacuum across said exterior opening area of said vent gap opening vacuums oven heat communicating from the interior of said oven cavity into said higher velocitys stronger stream of heated air.

4. The method of cooking food in a kitchen appliance combination comprising a box like frame having walls, an oven liner defining a cooking cavity having a vent gap opening communicating from the interior of said cooking cavity, means of a passageway for heated air between a wall of said liner and a wall of said frame, means of a gas burner having a gas valve for connection to a source of gas, means to supply heat from the products of combustion of said gas burner to the interior of said cooking cavity, means to supply a stream of heated air from the products of combustion of said gas burner to flow into said passageway, also said kitchen appliance having an improvement comprising:

venturi means adapted to said passageway arranged to direct said flow of heated air flowing within said passageway to flow from said passageway into said venturi means, so that said venturi means increases the velocity of flow of said passageway stream of heated air to exceed its prior velocity flow while flowing within said passageway, said increased velocity of flow of said stream of heated air exits from said venturi means as a higher velocity, stronger more forceful jet stream of heated air, and also heated air of said higher velocity stream is directed by means provided, to flow across one side of said vent gap opening, and thence flows across the open entire area of the exterior of said vent gap opening, and thence flows to the opposite side of said vent gap opening, and thence flows away from said vent gap opening communicating from the interior of said cooking cavity, whereby said higher velocity stream of heated air flows or covers across the entire exterior open area of said vent gap opening communicating from the interior of said cooking cavity, so that the said flow of heated air while thusly flowing entirely across the open area of said vent gap opening maintains a strong vacuum across the entire exterior open area of said vent gap opening, so that said vacuum across said exterior open area of said vent gap opening vacuums oven heat communicating from the interior of said oven cavity into said higher velocitys stronger stream of heated air, the method comprising:

locating a food mass within said cooking cavity, activating said gas burner to supply a stream of heat to the interior of said cooking cavity to cook said food mass, said gas burner also supplys a stream of heated air to flow within said passageway and thence to flow into said venturi means, said venturi means increases the speed of flow of said stream of heated air entering said venturi means, while said heated air flows through said venturi means to an exit from said venturi means, supplying said heated air of the increased stream of heated air exiting from said venturi means as a flow of heated air crossing one side of said vent gap opening communicating from the interior of said oven cavity, thence crossing the entire vent gap opening area of said vent gap opening, and thence to the opposite side and away from said vent gap opening, in order to supply a strong vacuum across said vent gap opening, maintaining said strong vacuum across said oven cavity gap opening in order to vacuum heat of said heat supplied to the interior of said oven cavity which communicates through said vent gap opening into said strong vacuum of said stream of heated air across said vent gap opening while cooking said food mass.

* * * * *